Figure 1:
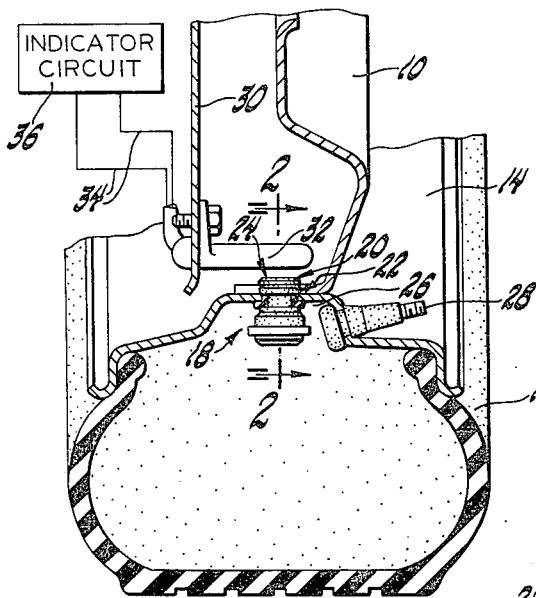

United States Patent [19]

Stewart et al.

[11] 4,337,718

[45] Jul. 6, 1982

[54] LOW TIRE PRESSURE TRANSDUCER

[75] Inventors: John A. Stewart, Flint; Wayne C. Nichols, Corunna, both of Mich.

[73] Assignee: General Motors Corporation, Detroit, Mich.

[21] Appl. No.: 173,032

[22] Filed: Jul. 28, 1980

[51] Int. Cl.³ .............................................. B60C 23/02
[52] U.S. Cl. .............................. 116/34 R; 33/DIG.1; 116/204
[58] Field of Search ............... 116/204, 34; 33/DIG.1

[56] References Cited

U.S. PATENT DOCUMENTS

| | | | |
|---|---|---|---|
| 2,915,035 | 1/1959 | Russell | 116/34 R |
| 3,453,590 | 7/1969 | Burgess et al. | 116/34 |
| 3,719,159 | 3/1973 | Davis | 116/34 R |
| 3,873,787 | 3/1975 | Nozi . | |
| 4,134,102 | 1/1979 | Stewart et al. . | |

Primary Examiner—Robert I. Smith
Attorney, Agent, or Firm—Warren D. Hill

[57] ABSTRACT

A low tire pressure transducer coupled to a tire rim includes a diaphragm subject to tire pressure on one side and to a mechanical spring force on the other side. A magnet within the transducer is coupled with a shunt which minimizes the external magnetic field when tire pressure is at its proper value. However, movement of the diaphragm occasioned by low tire pressure also moves the shunt so that the external magnetic field increases substantially. Movement of the shunt also opens a valve which relieves any air pressure buildup in the transducer on the spring side of the diaphragm thereby avoiding premature actuation of the transducer due to air leakage into the transducer. A retaining ring holds the transducer to the rim and contains vents for allowing the exhaust of air from the transducer.

2 Claims, 3 Drawing Figures

LOW TIRE PRESSURE TRANSDUCER

This invention relates to a low tire pressure sensor and in particular to a combined low tire pressure detector and magnetic signal sending unit.

It has been proposed previously to provide a low tire pressure sensor in a tire which compares the tire pressure with some reference and causes a magnetic signal to be emitted when the tire pressure reaches a predetermined low value. The magnetic signal is then detected by a sensor in a circuit which gives an indication of the low tire pressure condition. To provide a clear unmistakable magnetic signal, it is necessary to provide a high ratio of signal "on" to signal "off" magnetic flux at the sensor position. This is advantageously carried out by providing a magnet and a magnetic shunt within a transducer and a pressure responsive element for causing relative movement between the magnet and shunt to affect emission of a strong signal at low tire pressure and a weak signal at correct tire pressure. It is desirable that the unit be constructed economically and also that the unit be sealed to prevent entry of dirt and moisture. In such a sealed transducer, it is desirable to avoid affecting the reference calibration due to leakage of tire air into the transducer.

It is therefore an object of the invention to provide a low tire pressure transducer which is easily manufactured and provides a mechanism sealed against entrance of dirt and moisture and yet provides freedom from the effects of a pressure buildup in the transducer due to leakage.

The invention is carried out by providing a low tire pressure sending unit having a magnet assembly for emitting a magnetic flux signal, a diaphragm responsive to changes in tire pressure, a magnetic shunt moving with the diaphragm for selectively shunting the magnetic field to provide a nonsignalling state of the transducer and a valve operated by the magnet assembly upon incipient diaphragm movement to relieve any pressure buildup in the transducer due to diaphragm leakage.

Figure 2:
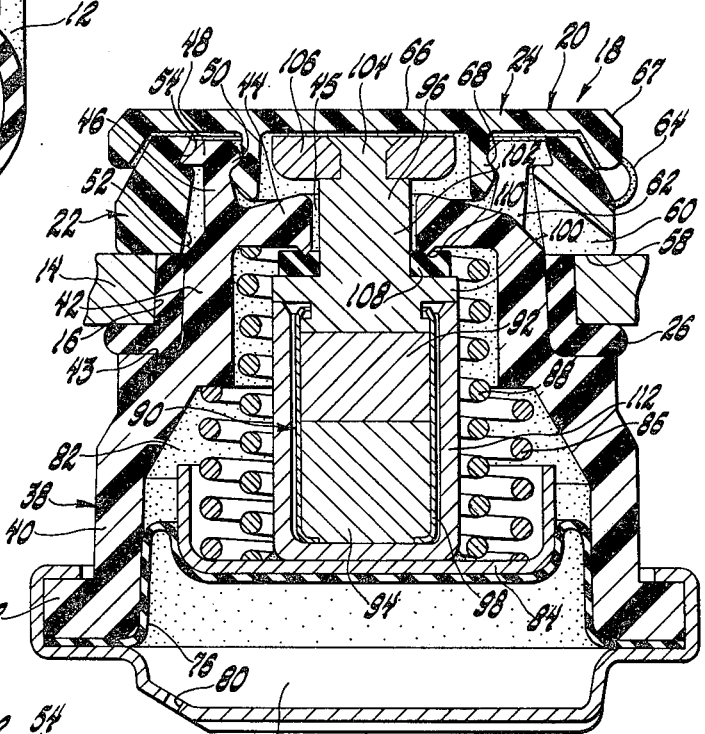
Figure 3:
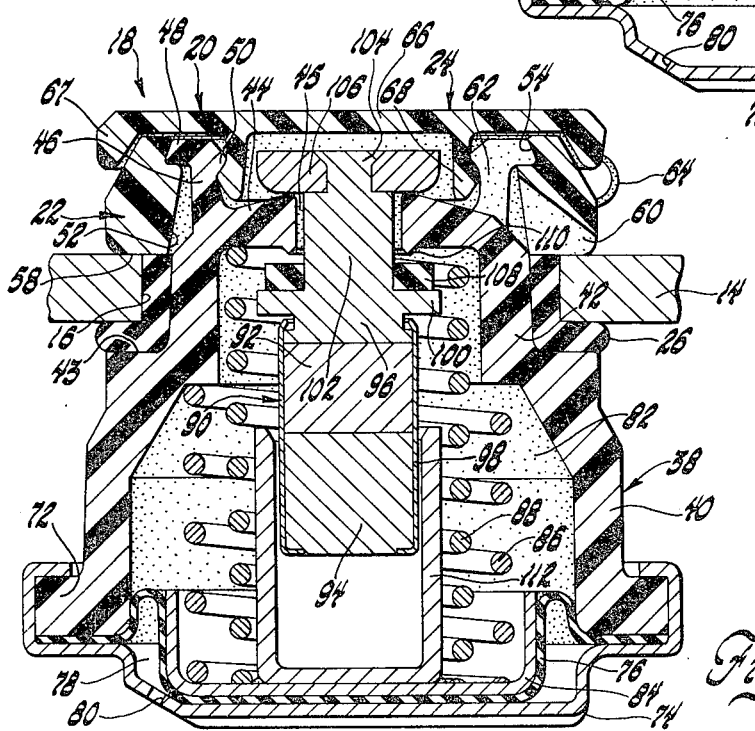

These and other objects and advantages of the invention will be made apparent from the following description and from the accompanying drawings in which:

FIG. 1 is a view of a low tire pressure warning system including a tire mounted low pressure detector and sending unit according to the invention, and FIG. 2 is a cross-sectional view of the low tire pressure transducer of FIG. 1 showing the nonactuated position of the mechanism, and FIG. 3 is a cross-sectional view of the low tire pressure transducer of FIG. 1 showing the actuated position of the mechanism.

In FIG. 1 a wheel 10 carrying a tire 12 has a drop center rim 14 having an aperture 16 to which a tire pressure transducer 18 is mounted. The transducer 18 is located primarily within the tire but has a signal emitter portion 20 extending through the rim. A retaining rim 22 and cover 24 applied to the emitter portion 20 fastens the transducer 18 to the rim via an expanded seal 26 which forms an airtight connection. A conventional tire stem 28 is also secured to an aperture in the rim and extends laterally therefrom. A stationary backing plate 30 mounted adjacent the vehicle wheel carries a sensor 32 which is located adjacent to the path of the transducer 18 as it moves with wheel rotation. The sensor 32 comprises a reed switch or the like which is sensitive to a magnetic field of a predetermined minimum value. A pair of electrical conductors 34 connect the transducer 32 to an indicator circuit 36 which provides a warning when tire pressure reaches a preassigned low level.

The transducer 18 is shown in detail in FIS. 2 and 3. The transducer 18 includes a housing 38 formed of molded plastic which has an inner body portion 40 fitting within the tire a smaller diameter neck portion 42 which extends outwardly through the aperture 16 in the rim 14 and a shoulder 43 defined by the step diameter change between the body portion and the neck. The seal 26 in the aperture 16 tightly engages the neck portion 42 and the shoulder 43. The outer end of the neck is partially closed by wall 44 defining a large central port 45. An annular retainer 46 extends from the wall 44 of the housing and has a foot-shaped cross-section with an outwardly directed toe portion 48 and an inwardly directed heel portion 50. The retaining ring 22 which snaps over the retainer 46 has an inner ramp surface 52 which facilitates installing the retainer ring 22 and a notch 54 which locks over the toe portion 48. A shoulder 58 on the retaining ring engages the expansible seal 26 or even the rim 14 to hold the transducer 18 in place. Slots 60 and 62 in the retaining ring 22 and the retainer 46 respectively allow free passage of air from the port 45 and are so positioned that centrifugal force derived from wheel rotation tends to throw out dirt and water which attempts to enter the slots. The cover 24 which is attached to the retaining ring by a living hinge 64 comprises a disk 66 which covers the opening of the retaining ring 22 and has a peripheral flange 67 which surrounds the sides of the ring 22. The cover is held in place by an inwardly extending cylindrical wall 68 fitting within the retainer 46. The wall 68 has an annular bulge on its outer periphery which locks behind the heel portion 50 of the retainer. The end of the housing opposite the retaining mechanism terminates in an outwardly extending flange 72. A metallic cover 74 encloses the end of the housing and is crimped around the flange 72 at its periphery. The cover 74 in combination with the housing 38 defines a transducer cavity containing several moving parts.

In FIG. 2 the internal parts are shown in the nonsignalling state of the transducer and in FIG. 3 they are shown in the signalling or actuated state of the transducer. A diaphragm 76 clamped at its periphery between the flange 72 and the cover 74 divides the transducer cavity into two chambers. A tire pressure chamber 78 defined by the diaphragm and the cover 74 is supplied with tire air pressure through a vent 80 in the cover. A reference chamber 82 defined by the space between the diaphragm and the housing 38 contains other moving parts of the transducer. A metal cup-shaped spring retainer 84 in the reference chamber 82 is held against the diaphragm by a pair of springs 86 and 88 and distributes the spring force evenly across the center portion of the diaphragm. The springs 86 and 88 are stainless steel coil springs of different lengths which extend between the spring retainer 84 and the inner wall of the housing 38. The size and spring rate of each spring is selected to provide the desired force against the diaphragm in accordance with the low tire pressure limit selected for a given transducer. A magnet assembly 90 includes a permanent magnet 92 of a rare earth material which when magnetized has a high energy product, and a pair of end pieces 94 and 96 mounted on the inner and outer ends of the magnet 92 respectivly. The magnet 92 has opposite poles adjacent the end pieces. A brass shell 98 is wrapped around the magnet and the pole pieces to complete the magnet assembly and has in-turned ends gripping shoulders formed on the end pieces to secure the elements of the magnet assembly. The brass shell 98, in addition to maintaining the integrity of the assembly, provides a sliding bearing surface and a spacing between the magnetic material of the magnet assembly and a shunt to be described below.

Beyond the end of the brass shell 98, the end piece 96 carries a peripheral flange 100, a cylindrical portion 102 which extends through the port 45 in the housing 38 and a terminal pin 104. An outer pole piece 106 with a central aperture is fit over the pin 104 and riveted thereto by upsetting the pin 104. The pole piece is larger in diameter than the port 45 as is the flange 100 so that the portion 102 of the end piece is trapped in the port 45. While the pole piece 106 is outside the housing 38, it is enclosed by the cover 24 and resides within the wall 68. An annular buytl rubber seal 108 is disposed against the outer surface of the flange 100 around the cylinder portion 102. An inwardly directed rim 110 surrounding the port 45 on the inner surface of the housing 38 provides a valve seat which is selectively engaged by the seal 108 so that the end piece 96 serves as a poppet. The parts are so dimensioned that when the seal is fully seated against the seat 110, the rear surface of the pole piece 106 is spaced from the outer surface of the housing 38 by a few hundredths of an inch and when the rear surface of the pole piece is against or near the outer surface of the housing, the seal 108 is unseated. Thus there is a small amount of end play of the magnet assembly which results in a valving action.

A cup-shaped magnetic shunt 112 is welded to the spring retainer 84 and is disposed within the confines of the spring 88 and outside the brass shell 98. The rim of the shunt 112 engages the inner surface of the flange 100 when the transducer is in nonsignalling state to form a magnetic flux path from the flange 100 through the shunt to the inner end of the end piece 94. Ideally the bottom of the cup-shape shunt 112 touches the inner end of end piece 94 when the rim of the shunt touches the flange 100 in order to maximize the permeability of the shunt path but where practical manufacturing tolerances require a preferred dimension the front rim of the shunt 112 must touch the flange 100 since it provides a magnetic latching function and a small space is allowed between the end piece 94 and the shunt 112.

In operation before the tire is inflated the transducer will be in its signalling state as shown in FIG. 3. That is, the diaphragm and shunt are retracted due to the action of the springs 86 and 88 on the spring retainer. The cover 74 serves as a diaphragm stop to limit the spring expansion. The magnet assembly 90 will be attracted toward the shunt 112 so that the seal 108 is lifted from its seat and the valve is open with the pole piece 106 engaging the housing 38 to limit movement of the magnet assembly toward the shunt but not forming an airtight seal. Thus the reference chamber 82 will be at atmospheric pressure. When, however, the tire is inflated to its correct tire pressure, that pressure acting on the diaphragm 76 will compress the springs so that the shunt 112 engages the flange 100 to close the magnetic flux path through the shunt and further will urge the seal 108 against its seat 112 to close the valve as shown in FIG. 2. Because of the operation of the shunt 112, a very low magnetic field will be evident beyond the cover 24. In the event the diaphragm 76 is not impervious or there is an air leak around the diaphragm crimp to allow a pressure buildup in the spring chamber 82, the pressure will increase from atmospheric pressure to a higher level. Then that air pressure coupled with the force of the springs 86 and 88 is sufficient to urge the diaphragm a small amount toward the cover 74, the seal 108 will become unseated to allow escape of the air through the port 45 and through the slots 60 and 62 to atmosphere. That brief air pulse would assist the centrifugal motion in ejecting foreign material from the slots. With the buildup of air pressure thus relieved, the tire pressure in the chamber 78 will move the diaphragm back to its normal nonsignalling position. All this occurs without separation of the shunt 112 from the flange 100 thereby allowing the purging action to take place without any increase in the magnetic signal. When, however, actual decrease of tire pressure occurs below the low limit set by the selection of the springs and by the magnetic latching force between the shunt 112 and the flange 100, the shunt 112 will move away from the flange to break the magnetic shunt path and allow a magnetic flux signal of significant strength outside the cover 24.

It will thus be seen that the tire pressure transducer according to the invention provides an economical, easily fabricated sealed transducer which allows the use of pervious diaphragm material and even allows satisfactory operation from devices with imperfect crimp joints without sacrificing transducer accuracy or reliability due to an air pressure buildup.

The embodiments of the invention in which an exclusive property or privilege is claimed are defined as follows:

1. A low tire pressure transducer for emitting a magnetic signal when tire pressure falls below a set value comprising
    a housing,
    means engaging the housing for retaining the housing on a tire rim,
    a diaphragm extending across the housing to separate the housing into first and second chambers, the second chamber being subject to a pressure buildup due to leakage,
    vent means in the housing for supplying tire pressure to the first chamber,
    a valve comprising a port in the housing connecting the second chamber to atmosphere and a closure member for selectively closing the port,
    magnetic signalling means including a first portion mounted for movement with the diaphragm and a second portion connected to the closure member and loosely mounted to the housing for limited movement, so that diaphragm movement can selectively separate and move the portions together,
    one of the portions comprising a magnet assembly for producing a magnetic flux,
    the other of the portions comprising a magnetic shunt for containing at least part of the magnetic flux when the diaphragm moves the portions together to thereby subdue magnetic flux emitted from the transducer, and
    spring means in the second chamber acting along with air pressure in the second chamber against the diaphragm for momentarily moving both portions and opening the valve to relieve pressure buildup when it occurs and for separating the first and second portions when tire pressure falls below the preset value, whereupon the shunt is moved away from the magnet to permit magnetic flux to be emitted from the transducer.

2. A low tire pressure transducer for emitting a magnetic signal when tire pressure falls below a set value comprising a housing having a portion for fitting in a tire rim aperture, means engaging the said portion for retaining the housing on a tire rim, a diaphragm extending across the housing to separate the housing into first and second chambers, the second chamber being subject to a pressure buildup due to leakage, vent means in the housing for supplying tire pressure to the first chamber, a valve for relieving pressure buildup in the second chamber comprising a port in the housing for connecting the second chamber to atmosphere and a poppet for selectively closing the port, a magnet assembly in the second chamber connected to the poppet for movement therewith, the assembly including a magnet, an end piece extending through the port, and a port closing member, a cup-shaped magnetic shunt attached to the diaphragm for movement therewith and positioned to cover at least a portion of the magnet assembly and divert magnetic flux from the end piece when the diaphragm is urged against the magnet assembly by tire pressure, and spring means in the second chamber acting along with air pressure in the second chamber against the diaphragm for momentarily moving the magnet assembly and poppet and opening the valve to relieve pressure buildup when it occurs and for pushing the diaphragm away from the magnet assembly when tire pressure falls below the set value, whereupon the shunt is moved away from the magnet to permit magnetic flux to be emitted through the end piece.

* * * * *